US012683037B2

(12) United States Patent
Gackstetter et al.

(10) Patent No.: US 12,683,037 B2
(45) Date of Patent: Jul. 14, 2026

(54) ISOLATION BARRIER SYSTEMS

(71) Applicant: Hamilton Sundstrand Corporation, Charlotte, NC (US)

(72) Inventors: David Gackstetter, Rockford, IL (US); Robert C. Cooney, Janesville, WI (US)

(73) Assignee: Hamilton Sundstrand Corporation, Charlotte, NC (US)

(*) Notice: Subject to any disclaimer, the term of this patent is extended or adjusted under 35 U.S.C. 154(b) by 214 days.

(21) Appl. No.: 18/402,123

(22) Filed: Jan. 2, 2024

(65) Prior Publication Data

US 2025/0218620 A1 Jul. 3, 2025

(51) Int. Cl.
*H01B 5/00* (2006.01)

(52) U.S. Cl.
CPC .................................... *H01B 5/002* (2013.01)

(58) Field of Classification Search
CPC .............................. H01B 5/002; H02B 13/025
See application file for complete search history.

(56) References Cited

U.S. PATENT DOCUMENTS 9,972,927 B2 * 5/2018 Nichols .................. H01R 13/71
2009/0141432 A1 * 6/2009 Kingston ............. H02B 13/025 361/676
2017/0301489 A1 * 10/2017 Palvadi .................. H01H 33/08
2020/0335951 A1 10/2020 Gentsch et al.
2022/0344914 A1 * 10/2022 Beaver ................. H02B 13/005

FOREIGN PATENT DOCUMENTS

CA 2511148 A1 12/2005
CH 598705 A5 * 5/1978 ........... H02B 13/025
DE 7232011 U 11/1972

OTHER PUBLICATIONS

EMR NI PXI Catalog (Year: 2024).*
PXI Catalog, Mar. 11 (Year: 2020).*
European Search Report dated Apr. 28, 2025 in connection with European Patent Application No. 25150015.3, 11 pages.

* cited by examiner

*Primary Examiner* — Crystal L Hammond
*Assistant Examiner* — Samantha L Faubert

(57) ABSTRACT

A system can include a chassis and a multilayer structure disposed within the chassis, the multilayer structure configured to attract and electrically isolate an arc. The multilayer structure can include one or more outer layers configured and adapted to attract the arc and an inner layer configured and adapted to electrically isolate the arc. The one or more outer layers can include a first outer layer and a second outer layer. The inner layer can be sandwiched between the first outer layer and the second outer layer.

20 Claims, 3 Drawing Sheets

ISOLATION BARRIER SYSTEMS

FIELD

This disclosure relates to isolation barrier systems.

BACKGROUND

Arc faults within electronic chassis can cause damage within the chassis and damage to other areas in contact with the chassis or components within the chassis. There is a need in the art to prevent damage from arcs within electronic systems, e.g., in aircraft.

Such conventional methods and systems have generally been considered satisfactory for their intended purpose. However, there is still a need in the art for improvements. The present disclosure provides a solution for this need.

SUMMARY

A system can include a chassis and a multilayer structure disposed within the chassis, the multilayer structure configured to attract and electrically isolate an arc. The multilayer structure can include one or more outer layers configured and adapted to attract the arc and an inner layer configured and adapted to electrically isolate the arc. The one or more outer layers can include a first outer layer and a second outer layer. The inner layer can be sandwiched between the first outer layer and the second outer layer.

In certain embodiments, the one or more outer layers can be made of conductive material. The one or more outer layers can be operatively connected to electrical ground. The one or more outer layers can have a thickness such that the arc is configured to burn through the one or more outer layer creating an open condition.

In certain embodiments, the one or more outer layers can be configured and adapted to attract the arc such that the arc burns through the one or more outer layers and severs a connection between the one or more outer layers and electrical ground creating an open condition. In the open condition the inner layer can be configured to quench the arc and shut down the system. In the open condition the inner layer can prevent the arc from traveling from a section of the chassis where the arc occurred into a neighboring section of the chassis.

In certain embodiments, the chassis can have an AC side and a DC side. The multilayer structure can be disposed between the AC side and the DC side and can be configured to separate the AC side from the DC side.

In certain embodiments, the multilayer structure can be configured to slide into the chassis and can be configured to be bolted to a back wall of the chassis. The multilayer structure can be configured to be placed between one or more printed wiring boards (PWBs).

In accordance with at least one aspect of this disclosure, a multilayer structure can include a first outer layer and a second outer layer, the first and second outer layers configured to attract an arc, and an insulating inner layer sandwiched in between the first outer layer and the second outer layer. The inner layer can be configured to contain the arc.

In certain embodiments, the multilayer structure can be configured to be disposed within an electronic chassis. The multilayer structure can be configured to contain the arc within a section of the chassis where the arc occurs and prevent the arc from travelling into neighboring sections of the chassis.

In certain embodiments, the first and second outer layers can be made of a conductive material. The first and second outer layers can be operatively connected to electrical ground, such that the arc burns through one of the first or second outer layers breaking the connection to electrical ground to contain the arc within the chassis section where the arc occurs.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
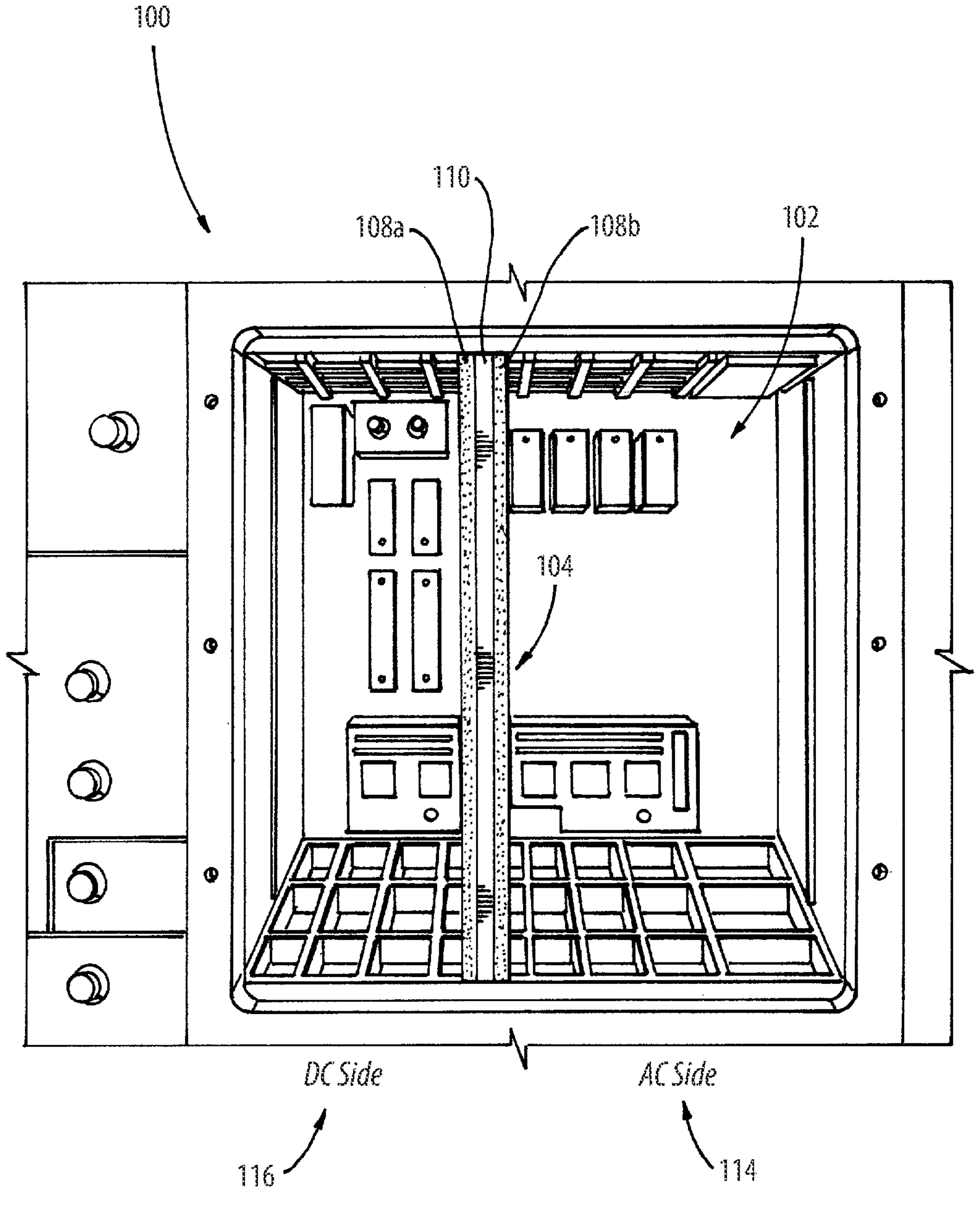
FIG. 1 is a cross sectional view of an embodiment of a system in accordance with this disclosure, showing a multilayer structure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other views, embodiments, and/or aspects of this disclosure are illustrated in FIGS. 2-3.

Figure 2:
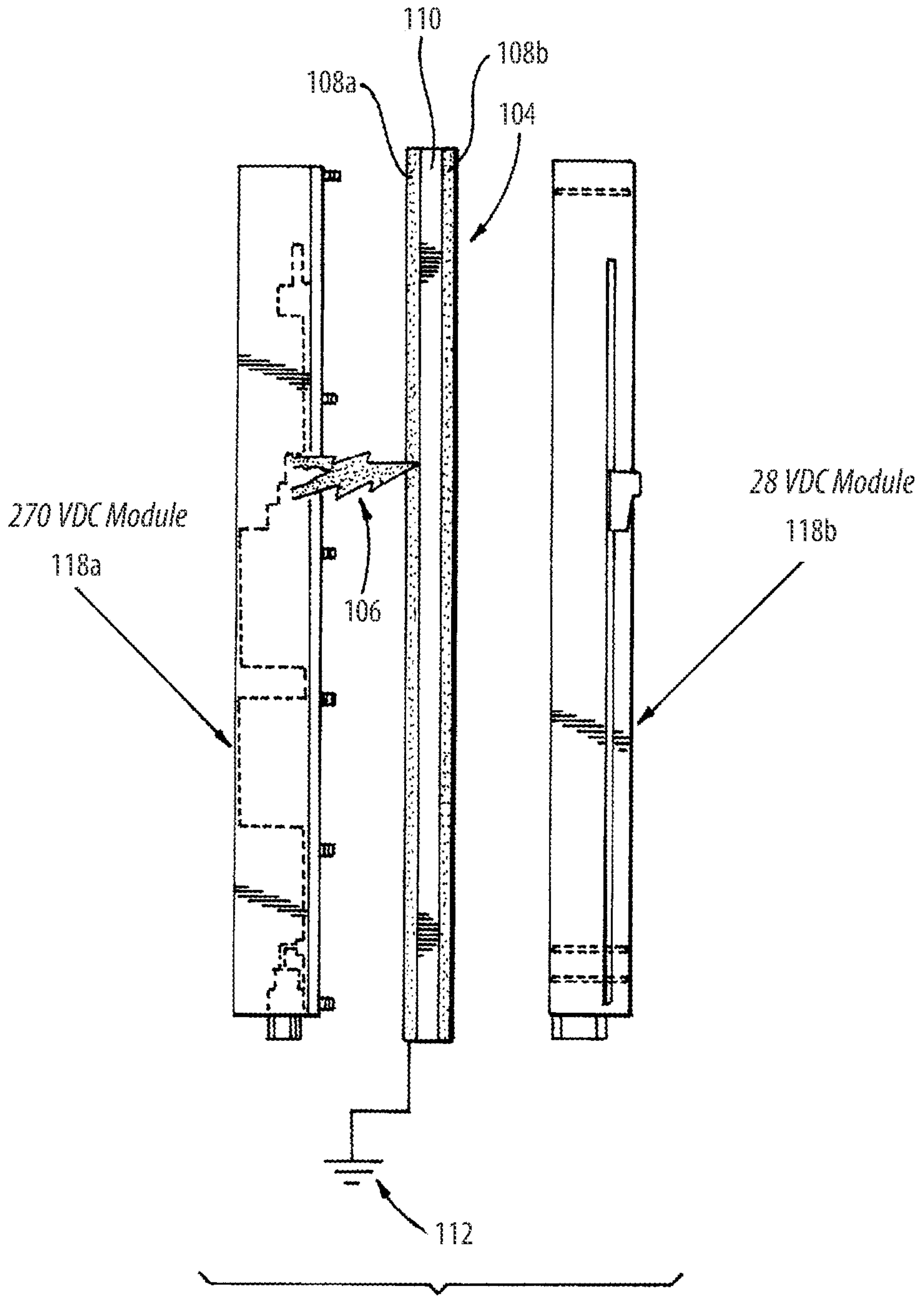
FIG. 2 is a cross sectional view of the multilayer structure of FIG. 1.
Figure 3:
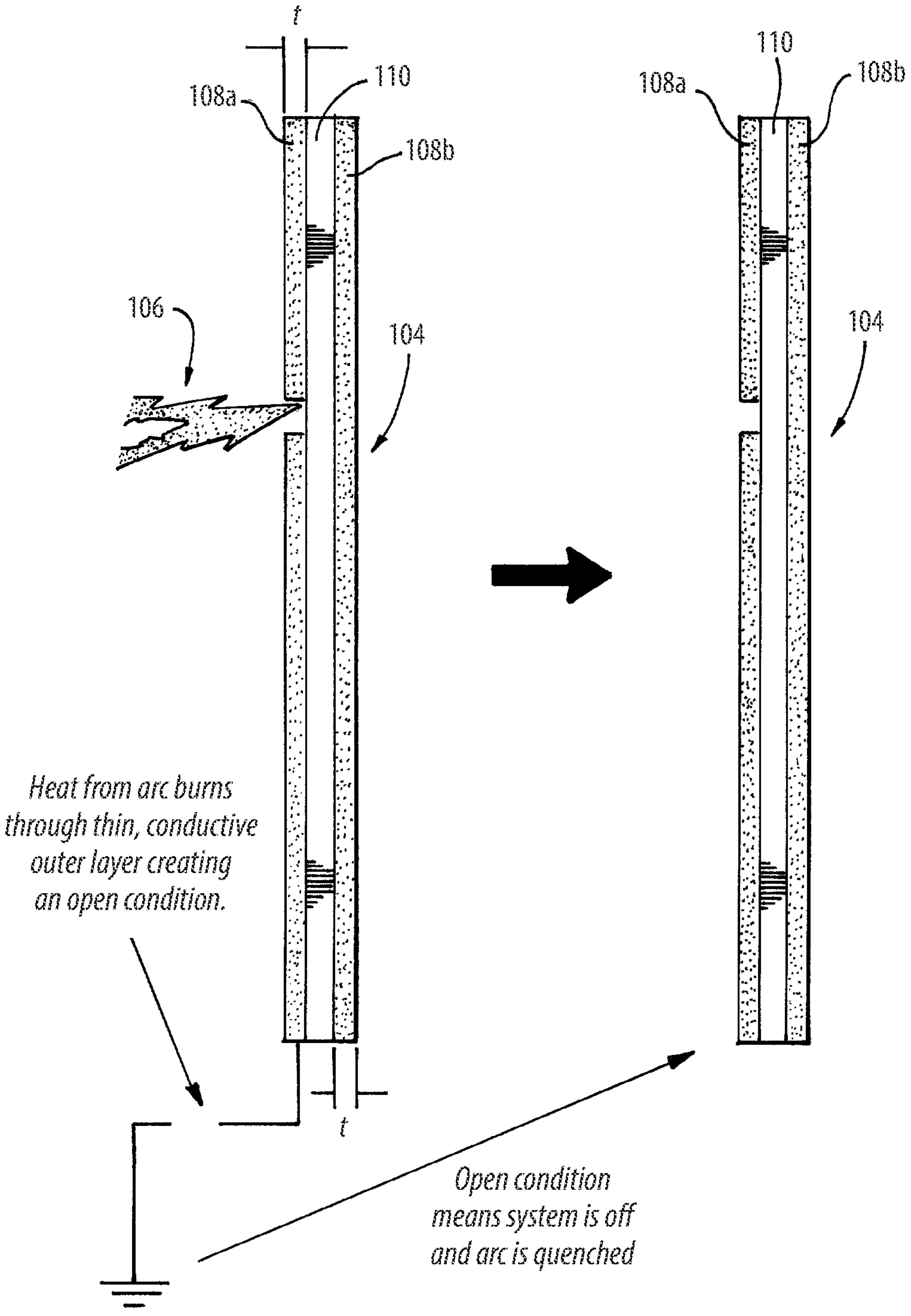
FIG. 3 is a cross sectional view of the multilayer structure of FIG. 2, shown in an open condition.

With reference to FIG. 1, a system 100 can include a chassis 102 and a multilayer structure 104 disposed within the chassis 102, the multilayer structure 104 configured to attract and electrically isolate an arc 106 (e.g., as shown in FIGS. 2 and 3). The multilayer structure 104 can include one or more outer layers 108*a*, 108*b* configured and adapted to attract the arc 106 and an inner layer 110 configured and adapted to electrically isolate the arc 106. The one or more outer layer 108*a*, 108*b* can include a first outer layer 108*a* and a second outer layer 108*b*. The inner layer 110 can be sandwiched between the first outer layer 108*a* and the second outer layer 108*b*.

In certain embodiments, the one or more outer layers 108*a*, 108*b* can be made of conductive material. In certain embodiments, the one or more outer layers 108*a*, 108*b* can be operatively connected to electrical ground 112 (e.g., as shown in FIGS. 2 and 3). The one or more outer layers 108*a*, 108*b* can have a thickness thin enough that the arc 106 is configured to burn through the outer layer 108 creating an open condition (e.g., as shown in FIG. 3, where the connection to electrical ground is broken). The thickness of the one or more outer walls 108*a*, 108*b* can be dependent on voltage and current. For example, the thickness of the one or more outer walls 108*a*, 108*b* can be 0.005 to 0.50 inches. The inner layer can be made of an electrically insulating material (e.g., polyamide or fiberglass filled epoxy) and can be 0.040 to 0.125 inches thick. The inner layer can be homogeneous or a sandwich structure with electrically conductive material (e.g. Aluminum) covered with electrically insulating material, then covered with outer layers 108_a_ and 108_b_. The ratio of the conductive and insulating layer thickness can be defined by the voltage and current of the various electrical sources and how much energy a given source can apply to an arc. For example, a 28 VDC bus at 100 Amps would need a much thinner insulator than a 1000 VDC bus with 1000 Amps. The thickness of the conductor would follow to ensure that the arc would be extinguished and not re-form.

In certain embodiments, the one or more outer layers 108_a_, 108_b_ can be configured and adapted to attract the arc 106 such that the arc burns through the one or more outer layers 108_a_, 108_b_ and severs a connection between the one or more outer layers 108_a_, 108_b_ and electrical ground 112 creating an open condition (e.g., as shown in FIG. 3). In the open condition the inner layer 110 can be configured to quench the arc 106 and shut down the system 100. In the open condition the inner layer 110 can prevent the arc 106 from traveling from a section 114 of the chassis 102 where the arc 106 occurred into a neighboring section 116 of the chassis 102.

In certain embodiments, the chassis 102 can have an AC side (for example, the first section 114 can be an AC side) and a DC side (for example, the neighboring section 116 can be a DC side). The multilayer structure 104 can be disposed between the AC side and the DC side and can be configured to separate the AC side from the DC side (e.g., as shown in FIG. 1).

In certain embodiments, the multilayer structure 104 can be configured to slide into the chassis 102 and can be configured to be bolted to a back wall of the chassis 102. The multilayer structure 104 can be configured to be placed between one or more printed wiring boards (PWBs) 118_a_, 118_b_ (e.g., as shown in FIG. 2). For example, the PWBs can be one of a 270 VDC module or a 28 VDC module.

In accordance with at least one aspect of this disclosure, a multilayer structure 104 can include a first outer layer 108_a_ and a second outer layer 108_b_, the first and second outer layers 108_a_, 108_b_ configured to attract an arc 106, and an insulating inner layer 110 sandwiched in between the first outer layer 108_a_ and the second outer layer 108_b_. The inner layer 110 can be configured to contain the arc 106.

In certain embodiments, the multilayer structure 104 can be configured to be disposed within an electronic chassis 102. The multilayer structure 104 can be configured to contain the arc 106 within a section (e.g., 114 or 116) of the chassis 102 where the arc 106 occurs and prevent the arc 106 from travelling into neighboring sections (e.g., 114 or 116) of the chassis 102.

In certain embodiments, the first and second outer layers 108_a_, 108_b_ can be made of a conductive material. The first and second outer layers 108_a_, 108_b_ can be operatively connected to electrical ground 112, such that the arc 106 burns through one of the first or second outer layers 108_a_, 108_b_ breaking the connection to electrical ground 112 to contain the arc 106 within the chassis section (e.g., 114 or 116) where it occurs.

In certain embodiments, a purposefully designed multilayer structure can be placed between differing sections of electronic chassis assemblies to prevent an arc fault from propagating to adjacent sections of the chassis or components thereof. To properly extinguish the arc while limiting arc-related damage to a single area or component, an open condition can be created. In certain embodiments, chassis sections (e.g., AC and DC zones as disclosed above) can be separated by a physical barrier (e.g., the multilayer structure) with conductive and insulating properties. In certain embodiments, the barrier can be free of through holes and have properties such that it both attracts an arc while limiting the arc to a specified section of the chassis.

Traditional approaches to separate components with various functions within a chassis have included firewall protection which is thick enough to withstand an arc for specified amount of time, however, such firewalls are often heavy and difficult to test. In certain embodiments of this disclosure, the barrier can electrically isolate the arc by way of a conductive path and prevent an arc occurring in one unit from causing an arc in another unit.

In certain embodiments, a multilayer structure can include a thin, conductive outer layer that attracts an arc. In certain embodiments, if an arc event occurs, the arc is attracted to the conductive outer layer and the heat generated by the arc burns through the thin surface of the conductive outer layer, breaking the electrical ground connection and thus tripping the system via an open condition to completely quench the arc. The outer conductive layer can be made of a thin, electrically conductive material. Such layers can be present on both sides of the multilayer structure (or only on one side in certain embodiments). In certain embodiments, the energy of the arc quickly overheats the thin outer layers of the multilayer structure, and the thin conductor layer melts or vaporizes due to the arc energy. This breaks the electrically conductive path and results in an open condition within a set amount of time such that an arc event doesn't propagate to adjacent sections of the chassis or other components in the same section of the chassis. In certain embodiments, the middle portion of the multilayer structure (e.g., inner layer) is electrically insulating and prevents the arc from propagating during the time it takes for the open condition to be met (e.g., the time it takes for the arc to destroy a portion of the outer layer).

In certain embodiments, the conductive outer later cause the arc to be directed towards it rather than random movement (e.g., the conductive outer surface can draw the arc to a specific place). Any conductive material for the conductive outer layer is contemplated herein. Electrical ground can be located between the units of a chassis to prevent interference between units. The multilayer structure can prevent interference (e.g., acting as a barrier between layers) and the electrical ground can prevent noise from escaping from one unit to another. The inner insulator layer could be physical material or an air gap.

In certain embodiments, the conducting outer layers of the multilayer structure can attract an arc during an arcing event. In certain embodiments, because the multilayer structure is connected to electrical ground, the heat from the arc will burn through the thin, electrically conductive outer layer and create an open condition completely quenching the arc. In certain embodiments, the inner insulating layer of the multilayer structure can prevent the arc from propagating from one section of the chassis to another for the time it takes for the open condition to be met.

In certain embodiments, the barrier can be a screwed-on plate that separates differing sections of chassis. The barrier could also be used as a separator between different DC bus zones.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles “a”, “an”, and “the” as used herein and in the appended claims are used herein to refer to one or to more than one (i.e., to at least one) of the grammatical object of the article unless the context clearly indicates otherwise. By way of example, “an element” means one element or more than one element.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e., “one or the other but not both”) when preceded by terms of exclusivity, such as “either,” “one of,” “only one of,” or “exactly one of.”

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:

a chassis; and a multilayer structure disposed within the chassis and including (i) one or more outer layers configured to attract an arc such that the arc burns through the one or more outer layers and severs an electrical connection between the one or more outer layers and electrical ground creating an open circuit condition for the arc and (ii) an inner layer configured to electrically isolate the arc.

2. The system of claim 1, wherein the one or more outer layers include a first outer layer and a second outer layer, wherein the inner layer is sandwiched therebetween.

3. The system of claim 1, wherein the one or more outer layers are made of conductive material.

4. The system of claim 1, wherein the one or more outer layers have a thickness such that the arc is configured to burn through the one or more outer layers creating the open circuit condition.

5. The system of claim 1, wherein, in the open circuit condition, the inner layer is configured to quench the arc and shut down the system.

6. The system of claim 5, wherein, in the open circuit condition, the inner layer prevents the arc from traveling from a section of the chassis where the arc occurred into a neighboring section of the chassis.

7. The system of claim 1, wherein the chassis has an AC side and a DC side, wherein the multilayer structure is disposed between the AC side and the DC side and is configured to separate the AC side from the DC side.

8. The system of claim 1, wherein the chassis has a Bus A side and a Bus B side, wherein the multilayer structure is disposed between the Bus A side and the Bus B side and is configured to separate the Bus A side from the Bus B side.

9. The system of claim 8, wherein Bus A and Bus B are of differing potentials.

10. The system of claim 8, wherein Bus A and Bus B are of a same potential but connected to differing sources.

11. The system of claim 1, wherein the multilayer structure is configured to slide into the chassis and is configured to be bolted to a back wall of the chassis.

12. The system of claim 1, wherein the multilayer structure is configured to be placed between one or more printed wiring boards (PWBs).

13. A multilayer structure, comprising:

a first outer layer;

a second outer layer, wherein the first and second outer layers are (i) configured to attract an arc and (ii) operatively connected to electrical ground such that the arc burns through one of the first and second outer layers and breaks a connection to electrical ground; and an insulating inner layer sandwiched in between the first outer layer and the second outer layer, wherein the inner layer is configured to contain the arc.

14. The multilayer structure of claim 13, wherein the multilayer structure is configured to be disposed within an electronic chassis.

15. The multilayer structure of claim 14, wherein the multilayer structure is configured to contain the arc within a section of the electronic chassis where the arc occurs and prevent the arc from travelling into neighboring sections of the electronic chassis.

16. The multilayer structure of claim 14, wherein the multilayer structure is configured to slide into the electronic chassis and is configured to be bolted to a back wall of the electronic chassis.

17. The multilayer structure of claim 14, wherein:

the electronic chassis has an AC side and a DC side; and the multilayer structure is configured to be disposed between the AC side and the DC side and separate the AC side from the DC side.

18. The multilayer structure of claim 14, wherein:

the electronic chassis has a Bus A side and a Bus B side; and the multilayer structure is configured to be disposed between the Bus A side and the Bus B side and separate the Bus A side from the Bus B side.

19. The multilayer structure of claim 13, wherein the first and second outer layers are made of a conductive material.

20. The multilayer structure of claim 13, wherein the multilayer structure is configured to be placed between one or more printed wiring boards (PWBs).

* * * * *